UNITED STATES PATENT OFFICE.

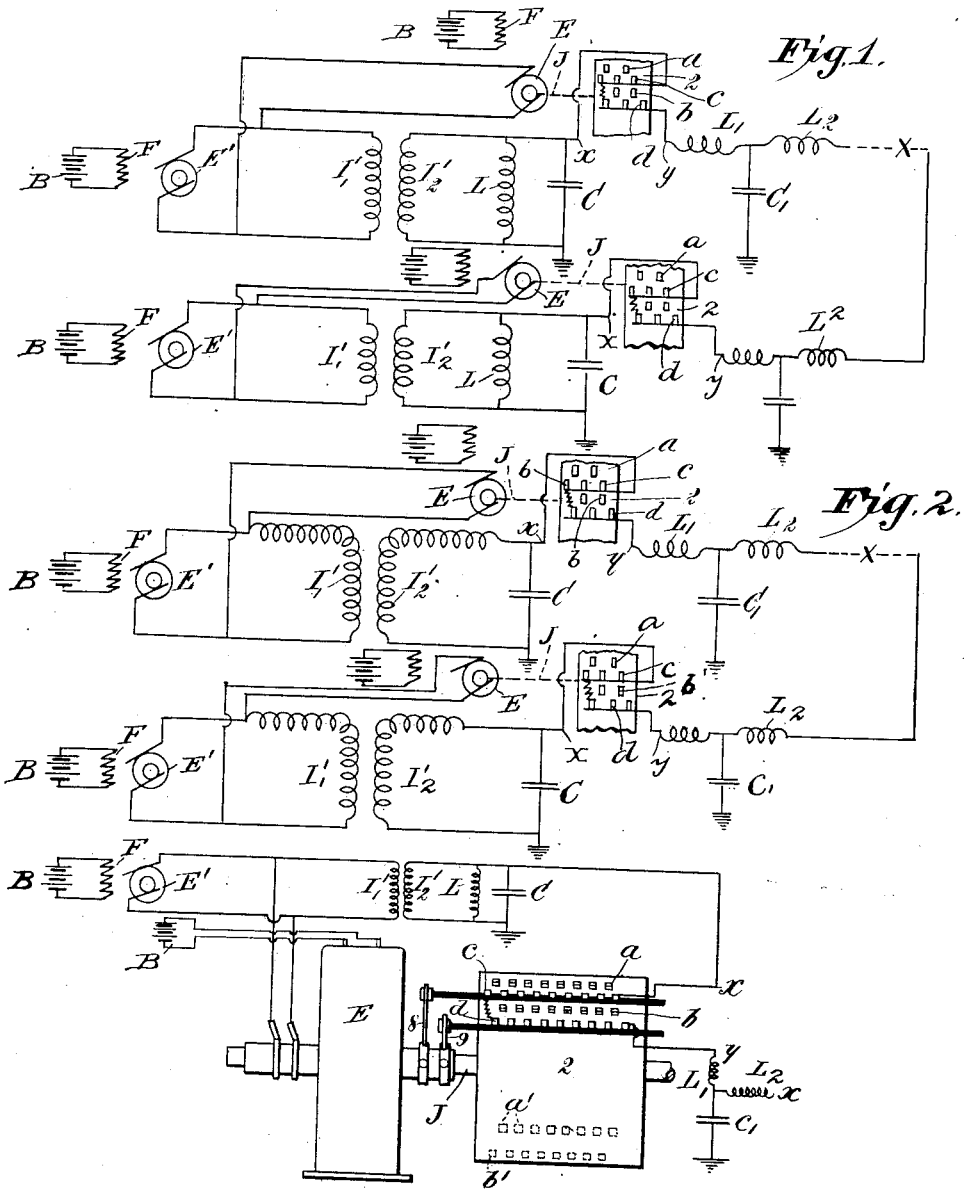

SEWALL CABOT, OF BROOKLINE, MASSACHUSETTS.

ELECTRICAL CONVERSION SYSTEM.

1,112,435. Specification of Letters Patent. Patented Oct. 6, 1914.

Original application filed December 4, 1909, Serial No. 531,306. Divided and this application filed August 10, 1911. Serial No. 643,322.

*To all whom it may concern:*

Be it known that I, SEWALL CABOT, a citizen of the United States, and a resident of Brookline, in the county of Norfolk and State of Massachusetts, have invented a new and useful Improvement in Electrical Conversion Systems, of which the following is a specification.

The invention herein described relates in general to the conversion of alternating current to direct current and vice versa and specifically to the conversion of low potential alternating current to high potential direct current and vice versa. In my application Serial No. 531,306, filed December 4, 1909, upon which Letters Patent 1,081,090 were issued December 9, 1913, I have described systems for converting low potential direct current into high potential direct current and vice versa and systems for converting alternating current into direct current and vice versa, but the claims of the present application, which is a division of said application, are restricted to systems whereby alternating current is converted into direct current, and vice versa.

I shall describe my invention with reference to the drawings which accompany and form a part of this specification and represent in diagram two arrangements of apparatus and circuits whereby my object can be carried into effect.

In the drawings,—Figure 1 shows in diagram one embodiment of my invention arranged for a low potential alternating source; Fig. 2 is a diagram showing a modification of the arrangement illustrated in Fig. 1, and Fig. 3 shows a detail of construction.

In the particular drawings selected for more fully disclosing my invention, E is an alternating current generator or a synchronous motor, according to how it is used, and if a generator, it is a source of low potential alternating current. The usual direct current excitation is produced by the source B, herein shown as a battery, connected with the field-winding F.

$I_1'$ and $I_2'$ in Fig. 1 are the low and high potential windings respectively of a constant potential type of commercial alternating current transformer. However, I do not wish to limit myself to the use of the constant potential transformer, because it is well understood by those versed in the art that substantially the same result may be effected by an arrangement such as shown in Fig. 2, in which $I_1'$, $I_2'$ are the windings of a transformer which may have appreciable magnetic leakage, a portion of each winding being out of inductive relation with the other.

Shunted across the terminals of the secondary $I_2'$ in Fig. 1 are the inductance L and condenser C. The natural period of the circuit L C may be made equal to the period of the alternating current supplied by the source E, so that said circuit will be resonant to the frequency of the alternating current which it is desired to rectify or else the frequency of the alternating current which it is desired to obtain at the distributing station by derectification from direct current.

At the points $x$ $y$ is inserted a synchronously operating device, such for example, as the rotary serially-subdivided switch described in my United States Letters Patent 917,749, dated April 13, 1909, whereby the necessity of resorting to excessively high peripheral velocity is obviated. The principle of this operation is, broadly speaking, the opening and closing of a circuit by simultaneously introducing or shunting out a large number of small gaps in series. This apparatus is shown in Fig. 3, in which E is an alternating current generator or synchronous motor according to how it is used. The device E is assumed to be a four-pole machine generating two cycles for each revolution, when used as a generator or giving one revolution for each two cycles when it is operated as a synchronous motor. As shown in Fig. 3, the rotor 2 is carried by the shaft J of the device E. When the device E is driven by an external source of power, for example, an electric motor or gas engine, alternating current is developed in the transformer primary $I_1'$ by said device E, which in this case is an alternating current generator. If, however, no external source of power is convenient, the device E may itself be energized by alternating current of the proper frequency, whereupon it operates as a synchronous motor, after having first been brought up to the proper speed in any of the usual well known ways. A source of such alternating current of said proper frequency is represented conventionally by E'. When said source E' is used to operate the device E as a synchronous motor, the energy of said source also supplies the transformer $I_1'$ $I_2'$. It will be understood of course that the source $E'$ may be a generator at a distantly located power station, the mains of which are connected with said device E and transformer, as shown, and also that an alternating current generator and a synchronous motor are the selfsame piece of apparatus, generating current when actuated by a source of power and generating power when actuated by a source of current, the difference being determined solely by the respective values of the impressed and counter electromotive force at the terminals thereof. In both cases, i. e., when the device E is an alternating current generator developing current or a synchronous motor actuated by alternating current, the rotor 2 is in synchronism with the alternating current which supplies the transformer primary $I_1'$, and the circuit between the points $x$ and $y$ is closed once per cycle. I may adjust the duration of such closure to suit any particular condition by proportioning the length of the members $a$ $b$ and $a'$ $b'$, and I may cause this closure to take place at the instant the potential of the condenser C is at a maximum or nearly a maximum by adjusting the rocker arms 8, 9 with respect to the rotor 2.

I have discovered that the establishment of the condition of electrical resonance aforesaid by the use of said condenser C adjusted to the proper value in one of the circuits of said transformer, results in a very practical improvement in the operation of the synchronous commutator rectifier and de-rectifier 2. For example, when the circuit L C is made resonant as aforesaid, it is possible to set the rocker arms once and for all to get the best results for all conditions of load. This is not possible unless said circuit is made resonant or approximately resonant to the frequency of the current which supplies the transformer. Then again, when the device 2 is used for rectifying alternating current, the use of resonance as aforesaid increases the power factor of the current drawn from the source, and where said rotor is used for de-rectifying direct current, such use of resonance preserves the sinusoidal character of the wave form of the alternating current obtained by de-rectification. I have found that the larger the current amplitude of the electrical oscillations in the circuit L C, the closer will be the approach to unity power factor and to the sinusoidal wave form.

The inductance $L_2$ is connected in series with the working circuit which may be a transmission line X, and is so proportioned as to prevent current fluctuations in said circuit. The condenser $C_1$ may be connected in shunt to said working circuit and preferably has a much larger capacity than the condenser C, so that it will operate to prevent potential fluctuations in said working circuit.

The arrangement of coils, condensers, etc., connecting the line X with the distributing station may be identical with that at the transmitting station, since the use of electrical resonance renders the device reversible. In this case the device E is a synchronous motor energized by the alternating current obtained by the de-rectification of the direct current received from the line X, and the source $E'$ may be disconnected, or may be left connected with its terminal voltage adjusted so that it supplies only sufficient energy to keep the motor E locked into rotation in synchronism with the frequency of said source. As shown, the apparatus at the distributing station is identical with that at the transmitting station and it will be obvious from the preceding description that either station may be used for transmitting or receiving and distributing dependent upon the ratio of transformation of the transformers at the respective stations. Specifically, the station shown in the upper part of Fig. 1 may convert low potential alternating current into very high potential direct current by means of the step-up transformer $I_1'$ $I_2'$, the resonant circuit L C and the synchronous commutator rectifier 2, and said direct current transmitted over the line X to the distributing station shown in the lower part of Fig. 1 where, by means of the synchronous commutator de-rectifier 2, the resonant circuit L C and the step-down transformer $I_2'$ $I_1'$, said high potential direct current may be converted into low potential alternating current in the working circuit connected with the motor E, it being necessary in this case that the ratio of transformation at the distributing station be slightly less than the ratio of transformation at the transmitting station if equal low potential voltages are desired at both stations, or else that the voltage of the source $E'$ at the distributing station be lower than that of the source at the transmitting station if equal ratios of transformation are employed at the two stations. It will be understood of course that any electro-responsive device or devices other than a motor may be connected in said working circuit.

When the natural period of the circuit L C is equal to the period of the alternating current source, the direction of the electromotive force on the condenser C i. e., the polarity of said condenser at the instant of closure of the circuit between the points $x$, $y$, will always be the same, and at the no-load condition will be approximately equal to $\sqrt{2}$ times the rated or R. M. S. voltage on the high potential side of the transformer. Should the potential of the storage condenser $C_1$ fall below this value, energy will be transferred to it from the condenser C in the manner described in my application Serial No. 531,306. Unless energy is being drawn from the line X, there can be no transfer of energy from the condenser C to the storage condenser $C_1$ and we would then have the no-load condition. During the no-load condition, no energy will pass outward to the working circuit, the impedance of the circuit $L_2'$ L C will be practically infinite and the transformer will take only normal exciting current. (In fact the exciting current may be made less than normal by a very small increase in the value of L.) The device is reversible and may be made to convert high potential direct current transmitted from a distant point over the line X to low potential alternating current, or low potential direct current to high potential alternating current, that is to say, direct current of either high or low potential received from the line X may be changed to alternating current of any desired potential in the circuit of the primary $I_1'$ by virtue of the rotary switch and interposed resonant circuit.

In the modification shown in Fig. 2, if the condenser C is adjusted to the proper value to make the circuit including the same substantially resonant to the frequency of the source, the exciting current at no-load condition will have a minimum value which may be made as small as desirable by keeping the resistance of the transformer windings low.

In putting my invention into practice I make the capacity of the condenser C such that with the voltage produced by the alternating current transformer, it will pass the current value desired in the oscillatory circuit L C. Having chosen a condenser of suitable capacity, then if a commercial constant potential transformer, as in Fig. 1, is used, I adjust the value of the inductance L until the no-load or exciting current drawn from the low-potential alternating current source is a minimum; but in case a special transformer is designed as in Fig. 2, I adjust the turns in the high potential winding until this same condition is attained. This adjustment insures arriving at the resonant condition giving best results.

It will be understood that various other modifications may be made in the arrangement of circuits hereinbefore described without departing from the principle of my invention.

I claim:

1. In an electrical conversion system, a source of alternating current, an alternating current transformer having one winding connected therewith, a condenser connected across the other winding of said transformer, the circuit including said condenser being resonant to the frequency of said alternating current, a working circuit, and means in synchronism with said alternating current for conveying energy unidirectionally from the resonant circuit to said working circuit.

2. In an electrical conversion system, a source of alternating current, an alternating current transformer having one winding connected therewith, a condenser connected across the other winding of said transformer, the circuit including said condenser being resonant to the frequency of said alternating current, a working circuit, means in synchronism with said alternating current for conveying energy unidirectionally from the resonant circuit to said working circuit, and an inductance in series with said working circuit for preventing current fluctuations therein.

3. In an electrical conversion system, a source of alternating current, an alternating current transformer having one winding connected therewith, a condenser connected across the other winding of said transformer, the circuit including said condenser being resonant to the frequency of said alternating current, a working circuit, means in synchronism with said alternating current for conveying energy unidirectionally from the resonant circuit to said working circuit, and a capacity in shunt to said working circuit for preventing fluctuations of potential therein.

4. In an electrical conversion system, a source of alternating current, an alternating current transformer having one winding connected therewith, a condenser connected across the other winding of said transformer, a working circuit, and means in synchronism with said alternating current for conveying energy unidirectionally from said condenser to said working circuit.

5. In an electrical conversion system, a source of alternating current, an alternating current transformer having one winding connected therewith, a condenser connected across the other winding of said transformer, a working circuit, means in synchronism with said alternating current for conveying energy unidirectionally from said condenser to said working circuit, and an inductance in series with said working circuit for preventing current fluctuations therein.

6. In an electrical conversion system, a source of alternating current, an alternating current transformer having one winding connected therewith, a condenser connected across the other winding of said transformer, a working circuit, means in synchronism with said alternating current for conveying energy unidirectionally from said condenser to said working circuit, and a capacity in shunt to said working circuit for preventing fluctuations of potential therein.

7. In an electrical conversion system, a source of direct current, an alternating current transformer associated therewith, a condenser connected across one winding of said transformer, the circuit including said condenser being resonant to a definite frequency, a rotary device operating at said frequency for conveying direct current energy from said direct current source to said condenser, and a working circuit connected to the other winding of said transformer to which alternating current energy is delivered.

8. In an electrical conversion system, a source of alternating current, a circuit energized thereby and resonant to the frequency thereof, a working circuit and means in synchronism with said alternating current for conveying energy unidirectionally from said resonant circuit to said working circuit.

9. In an electrical conversion system, a source of direct current, an alternating current transformer associated therewith, a condenser connected across one winding of said transformer, the circuit including said condenser being resonant to a definite frequency, a rotary device operating at said frequency for conveying direct current energy from said direct current source to said condenser, and a working circuit connected to the other winding of said transformer.

10. In an electrical conversion system a source of direct current, an alternating current transformer associated therewith, a condenser connected across one winding of said transformer, a non-polarity-changing rotary device for conveying direct current energy from said direct current source to said condenser and a working circuit associated with said transformer.

11. In an electrical conversion system, a source of alternating current, an alternating current transformer having one winding connected therewith, a condenser connected across the other winding of said transformer, the circuit including said condenser being resonant to the frequency of said alternating current, a working circuit, means in synchronism with said alternating current for conveying energy unidirectionally from the resonant circuit to said working circuit, a second alternating current transformer associated with said working circuit, a condenser connected across one winding of the last mentioned transformer, the circuit including the last mentioned condenser being resonant to a definite frequency, a rotary device operating at said last mentioned frequency for conveying direct current energy from said working circuit to the last mentioned condenser, and a working circuit connected to the other winding of the last mentioned transformer.

12. In an electrical conversion system, a source of alternating current, an alternating current transformer having one winding connected therewith, a condenser connected across the other winding of said transformer, a working circuit, means in synchronism with said alternating current for conveying energy unidirectionally from said condenser to said working circuit, a second alternating current transformer associated with said working circuit, a condenser connected across one winding of the last mentioned transformer, a rotary device for conveying direct current energy from said working circuit to the last mentioned condenser, and a working circuit associated with the last mentioned condenser.

13. In an electrical conversion system, a course of alternating current, a step-up transformer associated therewith, a synchronous commutator rectifier associated with the high potential side of said transformer, a synchronous commutator de-rectifier connected to said synchronous commutator rectifier, a step-down transformer associated with said synchronous commutator de-rectifier, a working circuit associated with the low potential side of said step-down transformer and an electro-responsive device in said working circuit.

In testimony whereof, I have hereunto subscribed my name this 9th day of August, 1911.

SEWALL CABOT.

Witnesses:
GEO. K. WOODWORTH,
E. B. TOMLINSON.